(12) United States Patent
Pellegrino (10) Patent No.: US 6,510,955 B2
(45) Date of Patent: Jan. 28, 2003

(54) BEAM AUTOMATIC LOCK (75) Inventor: John B. Pellegrino, Erie, PA (US)

(73) Assignee: Ridg-U-Rak, Inc., North East, PA (US)

( * ) Notice: Subject to any disclaimer, the term of this patent is extended or adjusted under 35 U.S.C. 154(b) by 78 days.

(21) Appl. No.: 09/816,892

(22) Filed: Mar. 23, 2001

(65) Prior Publication Data

US 2001/0045404 A1 Nov. 29, 2001

Related U.S. Application Data (60) Provisional application No. 60/195,643, filed on Apr. 7, 2000.

(51) Int. Cl.[7] ............................................. A47B 57/00
(52) U.S. Cl. ...................................................... 211/192
(58) Field of Search ............................... 211/192, 190, 211/208; 403/324

(56) References Cited

U.S. PATENT DOCUMENTS

| 617,500 A | 1/1899 | Ehling |
| 702,589 A | 6/1902 | Rast |
| 1,254,094 A | 1/1918 | Vogt |
| 1,702,937 A | 2/1929 | Friedemann |
| 1,803,431 A | 5/1931 | Hill |
| 1,847,486 A | 3/1932 | Keil |
| 1,914,720 A | 6/1933 | Hyams |
| 3,042,221 A | 7/1962 | Rasmussen ................. 211/148 |
| 3,070,237 A | 12/1962 | Fullerton et al. ........... 211/147 |
| 3,273,720 A | 9/1966 | Seiz ........................... 211/148 |
| 3,303,937 A | 2/1967 | McConnell ................. 211/148 |
| 3,330,583 A | 7/1967 | Kennedy et al. ........ 287/189.36 |
| 3,346,126 A | 10/1967 | Bloom et al. ............... 211/176 |
| 3,392,848 A | 7/1968 | McConnell et al. ........ 211/176 |
| 3,414,224 A | 12/1968 | Robbiliard et al. ......... 248/243 |
| 3,456,970 A | 7/1969 | Sunasky ................ 287/189.35 |
| 3,545,626 A | 12/1970 | Seiz ........................... 211/176 |
| 3,601,432 A | 8/1971 | Fenwick et al. ....... 287/189.36 |
| 3,612,290 A | 10/1971 | Evans ........................ 211/176 |
| 3,680,711 A | 8/1972 | Brucker .................... 211/105.3 |
| 3,697,034 A | 10/1972 | Shell .......................... 248/243 |
| 3,702,137 A | 11/1972 | Evans ........................ 211/176 |
| 3,741,405 A | 6/1973 | McConnell et al. ......... 211/177 |
| 3,744,068 A | 7/1973 | Harris ........................... 5/181 |
| 3,757,361 A | 9/1973 | Harris et al. .................. 5/184 |
| 3,877,579 A | 4/1975 | Weider ....................... 211/176 |

(List continued on next page.)

FOREIGN PATENT DOCUMENTS

GB        2 044 079 A     10/1980

*Primary Examiner*—Alvin Chin-Shue
*Assistant Examiner*—Sarah Purol
(74) *Attorney, Agent, or Firm*—Edward W. Goebel, Jr.; Jon L. Woodard; MacDonald, Illig, Jones & Britton LLP (57) ABSTRACT

An automatic locking apparatus releasably locks together a studded end plate connector to a notched vertical frame column of a storage rack. The automatic lock includes a vertical lever positioned adjacent one surface of an end plate connector when the end plate connector is mounted on a vertical frame column. A locking pin and tension support extend from the inside face of the vertical lever through the end plate connector. The tension support has a protruding end extending past the end plate connector and a tension device mounted on the protruding end to create a force for pulling the inside face of the vertical lever toward one surface of the end plate connector. The locking pin has a length that allows it to extend through the top of a notch or other aperture in the frame column when studs of the end plate connector are positioned in the bottom of corresponding notches in the frame column, preventing withdrawal of the studs from the notches. The locking pin automatically retracts as the end plate connector comes into contact with the frame column and automatically locks after the studs slide into the bottom of their corresponding notches of the vertical frame. The end plate connector can later be disconnected from the vertical column by pulling on the vertical lever to withdraw the locking pin, allowing the studs to slide up from the bottom of the notches.

22 Claims, 9 Drawing Sheets

U.S. PATENT DOCUMENTS

| | | | |
|---|---|---|---|
| 3,881,829 A | 5/1975 | James | 403/27 |
| 3,986,318 A | 10/1976 | McConnell | 52/758 |
| 4,074,812 A | 2/1978 | Skubic et al. | 211/192 |
| 4,165,944 A | 8/1979 | Sunasky | 403/254 |
| 4,223,711 A | 9/1980 | Tabor | 151/37 |
| 4,225,265 A | 9/1980 | Hooker et al. | 403/353 |
| 4,262,809 A | 4/1981 | McConnell | 211/192 |
| 4,285,436 A | 8/1981 | Konstant et al. | 211/192 |
| 4,536,904 A | 8/1985 | Whitehead | 5/201 |
| 4,554,692 A | 11/1985 | Whitehead | 5/411 |
| 4,632,222 A | 12/1986 | Chen | 182/179 |
| 4,917,442 A | 4/1990 | Johnson | 301/113 |
| 4,955,743 A | 9/1990 | King | 403/254 |
| 5,025,937 A | 6/1991 | King | 211/192 |
| 5,131,781 A | 7/1992 | Klein | 403/254 |
| 5,161,268 A | 11/1992 | Harrow | 5/201 |
| 5,350,074 A | 9/1994 | Rosenband | 211/192 |
| 5,494,246 A | 2/1996 | McCarthy et al. | 248/221.11 |
| 5,938,367 A | 8/1999 | Olson | 403/254 |

BEAM AUTOMATIC LOCK

This application claims the benefit of U.S. Provisional Application No. 60/195,643 filed on Apr. 7, 2000, which is incorporated herein by reference.

BACKGROUND

The present invention is directed to the field of storage rack systems. More particularly, the present invention is directed to an improved locking apparatus for preventing the disengagement of individual beam end plate connectors from vertical supporting frame columns in modular frame storage rack systems.

Modular frame storage rack assemblies are constructed around a plurality of vertical frame columns, each frame column having one or more lines of supporting notches positioned up and down the height of the column. The notches are generally tapered, having an upside-down tear drop shape making the notches wider near the top than at the bottom. Storage rack beams are positioned transversely between the columns and bear the weight of stored loads. The end of each beam typically includes an end plate connector having two or more studs on it for engaging the notches of a vertical frame column. Each stud has a base portion coupled directly to one surface of the end plate connector and a head portion distal to and having a substantially larger diameter than the base.

To engage a notch and secure the rack beam to a frame column, each stud's head must have a diameter small enough to enter its respective notch near the notch's top portion. Each stud's head must also have a diameter that is sufficiently large to be unable to leave the notch's bottom portion. The diameter of the base of each stud must be small enough to enter either the notch's top or bottom portion. During engagement, the head of each stud passes entirely through the top portion of a corresponding notch, leaving only the base portion still surrounded by the notch. Being sufficiently narrow to enter the notch's bottom portion, the base allows the stud to slide downward under the force of gravity while the stud's head remains extended past the notch. Once the stud enters the bottom portion of the notch, the stud's head remains posed beyond a surface of the frame column that is distal to the end plate connector. However, being of a larger diameter than the bottom notch portion, the stud's head cannot pass back through or withdraw laterally from the notch. So long as the studs are not forced to slide back up to the top portion of their corresponding notches, the heads of each stud continue to lock the end plate connector and rack beam in place.

Normally, the weight of such a typical storage rack beam combined with any borne load is sufficient to prevent upward movement of the studs, allowing the end plate connectors to remain securely in place. There are however, certain situations in which the studs may become disengaged by an accidental or unintended upward force. Such forces are frequently exerted during the loading or unloading of loads, during storage rack construction or reconfiguration, or when adjacent storage racks or loads come into contact with another storage rack or load. As a result, appropriate locking mechanisms must often be constructed to be able to withstand an upwards force of 1,000 pounds or more.

Previous locking apparatuses have included simple bolts, pinning devices, snaps, and spacers. Such devices achieve the result of securing a storage rack in place and are normally economical and reliable. However, many of these apparatuses require a great deal of manual labor to individually position, secure, and then ascertain that the devices have been properly engaged, often requiring the use of additional tools. The same manual labor must then be later exerted during disassembly. Such manual labor also presents an added risk that an accidental upwards and unlocking force may be exerted by a user during assembly or disassembly, posing an additional safety hazard for users or other persons who may be in the vicinity of the storage rack.

Other previous locking apparatuses have incorporated automatic engaging mechanisms coupled to the end plate connector. In these apparatuses, the locking function occurs automatically once a stud's base slides downward and enters the lower portion of a notch. Most often, a single spring-loaded pin or tab is automatically depressed upon the studs' entry into the notches of a frame column. As the stud slides downward, the spring-loaded pin or tab encounters a notch or another corresponding aperture in the frame column, allowing the pin or tab to depress and enter the aperture, locking the studs and end plate connector in place.

While these previous devices eliminate the need to manually secure storage beams in place after configuration, they typically suffer from a number of inherent disadvantages. Among existing designs, some fail to eliminate the need for an additional tool during either assembly or disassembly. In other automatic locking devices that do eliminate the need for additional tools, construction costs are significantly higher, making the devices cost-prohibitive for mass production. Such designs also frequently require the use of a costly external housing assembly for containing a spring or other tension device. When such an arrangement is used, a single locking pin may be limited to linear movement, which may in turn require the use of more than one finger by the user for effecting release of the locking mechanism. For example, such an apparatus might require that a knob be grabbed on the locking pin rather than merely flicking a lever. In some past designs that have permitted simpler levered operation using one finger, such as with a spring tab, there have been significant problems encountered with the spring tabs breaking, becoming loose, or falling off of their respective end plate connectors.

SUMMARY

The present invention is an automatic locking apparatus for releasably locking together a studded end plate connector to a notched vertical frame column of a storage rack. The automatic lock includes a vertical lever adjacent to one surface of the end plate connector when installed on the end plate connector. A locking pin and tension support extend from the inside face of the vertical lever through the end plate connector. The tension support has a protruding end extending past the end plate connector and a tension device mounted on the protruding end to create a force for pulling the inside face of the vertical lever toward the surface of the end plate connector. Studs, which are more aptly described as overlapping connectors, extend from the plate connector, The locking pin has a length that allows it to extend through the top of a notch or other aperture in the frame column when studs of the end plate connector are positioned in the bottom of their corresponding notches in the frame column, with material extending from the distal end of the stud overlapping material from the frame, preventing withdrawal of the studs from the notches. The locking pin is further mounted to automatically retract as the end plate connector comes into contact with the frame column and to automatically lock after the studs slide into the bottom of their corresponding notches. The end plate connector can later be disconnected from the vertical column by pulling on the vertical lever to withdraw the locking pin, allowing the studs to slide up from the bottom of the notches.

Various other features, advantages and characteristics of the present invention will become apparent to one of ordinary skill in the art after reading the following specification. This invention does not reside in any one of the features of the automatic lock disclosed above and in the following Detailed Description of the Preferred Embodiments and claimed below. Rather, this invention is distinguished from the prior art by its particular combination of features which are disclosed. Important features of this invention have been described below and shown in the drawings to illustrate the best mode contemplated to date of carrying out this invention.

Those skilled in the art will realize that this invention is capable of embodiments which are different from those shown and described below and that the details of the structure of this automatic lock can be changed in various manners without departing from the scope of this invention. Accordingly, the drawings and description below are to be regarded as illustrative in nature and are not to restrict the scope of this invention. The claims are to be regarded as including such equivalent automatic locks as do not depart from the spirit and scope of this invention.

BRIEF DESCRIPTION OF THE DRAWINGS

FIG. 8b is a bottom view of the alternative embodiment of FIG. 8a;

DETAILED DESCRIPTION OF THE PREFERRED EMBODIMENTS

Referring to the drawings, identical reference numbers and letters designate the same or corresponding parts throughout the several figures shown in the drawings.

Figure 1:
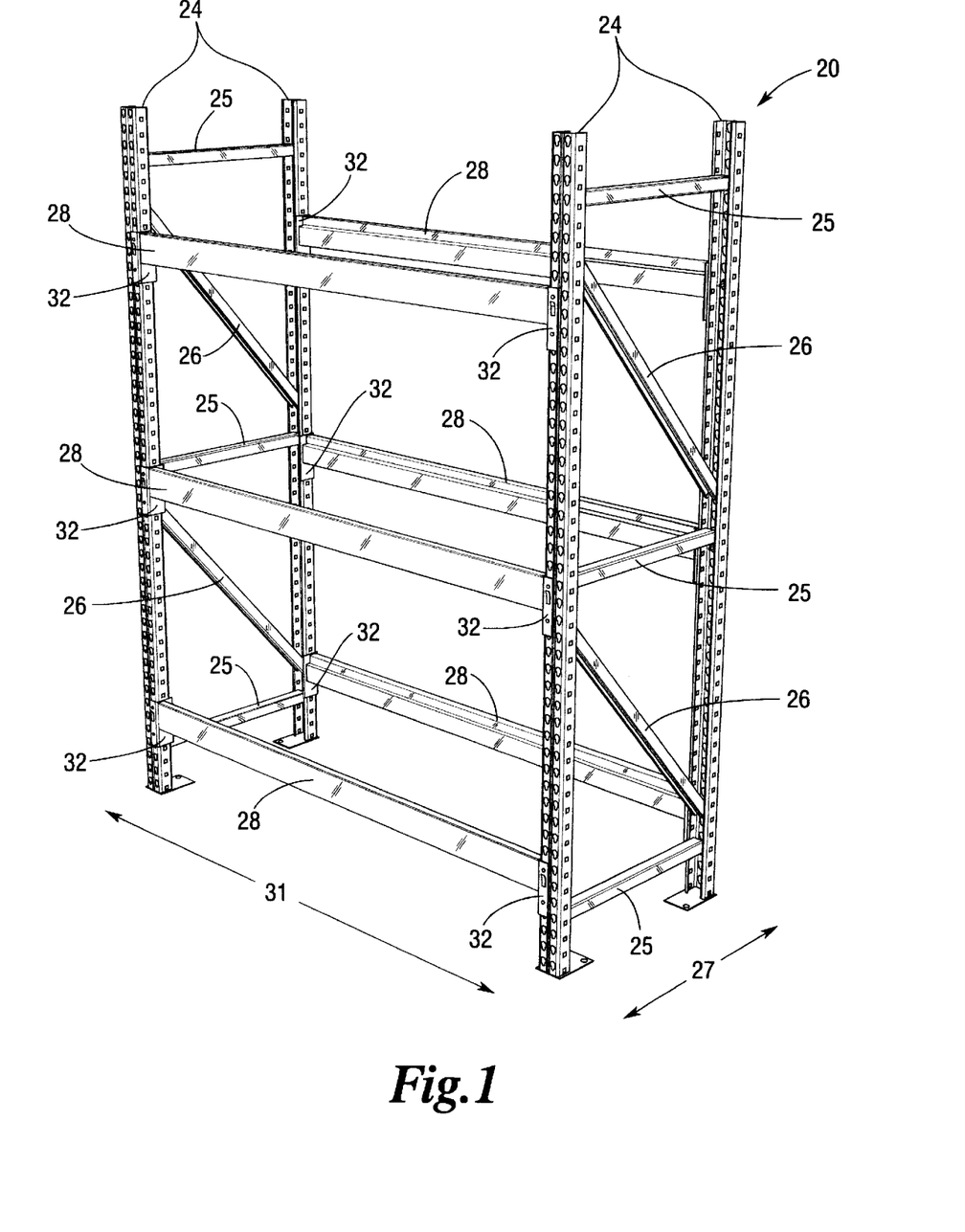
FIG. 1 depicts a typical modular frame storage rack assembly according to the subject matter of the invention.

FIG. 1 shows a modular frame storage rack 20 of the type that is the subject matter of the invention. Basic components of a modular frame storage rack storage system include a plurality of vertical frame columns 24 for supporting one or more horizontal storage rack beams 28, mounted transversely on the frame columns 24 across the rack's wider dimension 31. Non-load bearing horizontal cross pieces 25 and diagonal cross pieces. 26 serve to securely and permanently space adjacent frame columns 24 in fixed relative position across the rack's narrower dimension 27. Loads are borne by the storage system, placed on the storage rack beams 28 which are coupled to the frame columns 24 with endplate connectors 32. Normally, a planar surface (not shown), such as a shelf, will be placed between two or more storage rack beams 28 to provide surface area for storage. The storage rack 20 is modular in that the endplate connectors 32 may be disconnected from the vertical frame columns 24 and reconnected at alternate points along the height of the vertical frame columns 24. This variable placement of endplate connectors 32 permits the user to selectively place storage rack beams 28 at different relative heights within the storage rack 20 to individually meet the user's particular storage requirements.

Figure 2:
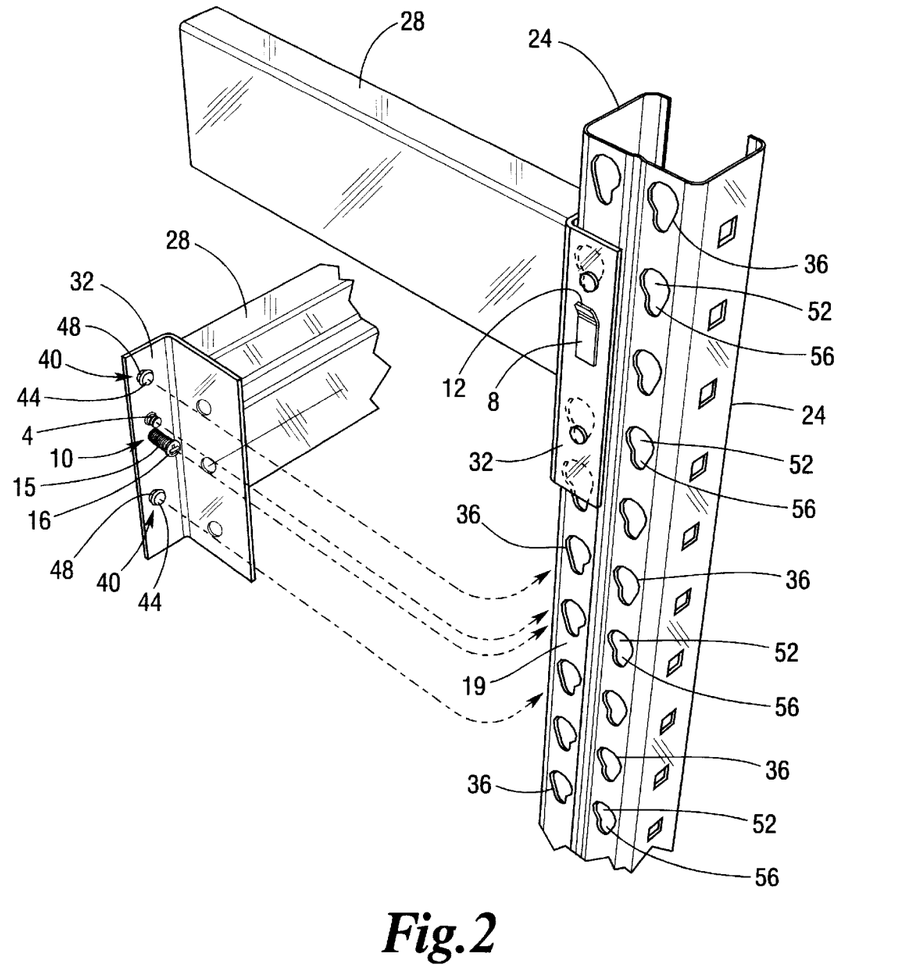
FIG. 2 is a schematic of the invention in use with storage rack beams and endplate connectors for securely attaching the endplate connectors to a vertical frame column.

As shown in FIG. 2, the endplate connectors 32 connect to the vertical frame columns 24 with overlapping connectors that insert into tapered notches 36 arranged in one or more vertical lines along the height of the vertical frame column 24. The overlapping connectors comprise studs 40 that have bases 48 coupled to the endplate connector 32 and heads 44 with diameters substantially wider than those of the studs' bases 48, The notches 36 on the vertical frame column 24 are teardrop shaped, each having a top 52 that is substantially wider than the bottom 56. The top 52 of each notch 36 is sufficiently wide to accommodate the head 44 of a stud 40, while the bottom 56 of each notch 36 is wide enough to accommodate only the base 48 of a stud 40. The notch bottom 56 is sufficiently narrow to prevent the head 44 of a stud 40 from passing through the notch 36 because the material of the head 44 overlaps the material of the vertical frame column 24. During the selective configuration of a storage rack 20, the storage rack beams 28 are positioned along the vertical frame column 24 at a selected height representing the desired level of storage. The studs 40 of the endplate connectors 32 are then inserted into corresponding notches 36 at each notches' top 52, The head 44 of each stud 40 passes entirely through its respective notch 36 until the notch 36 surrounds only the base 48 of the stud 40. Being of a sufficiently narrow diameter at its base 48, the stud is then free to enter the bottom 56 of the notch 36 and slides into the bottom 56 as the rack beam 28 moves downward under the force of gravity.

Figure 7:
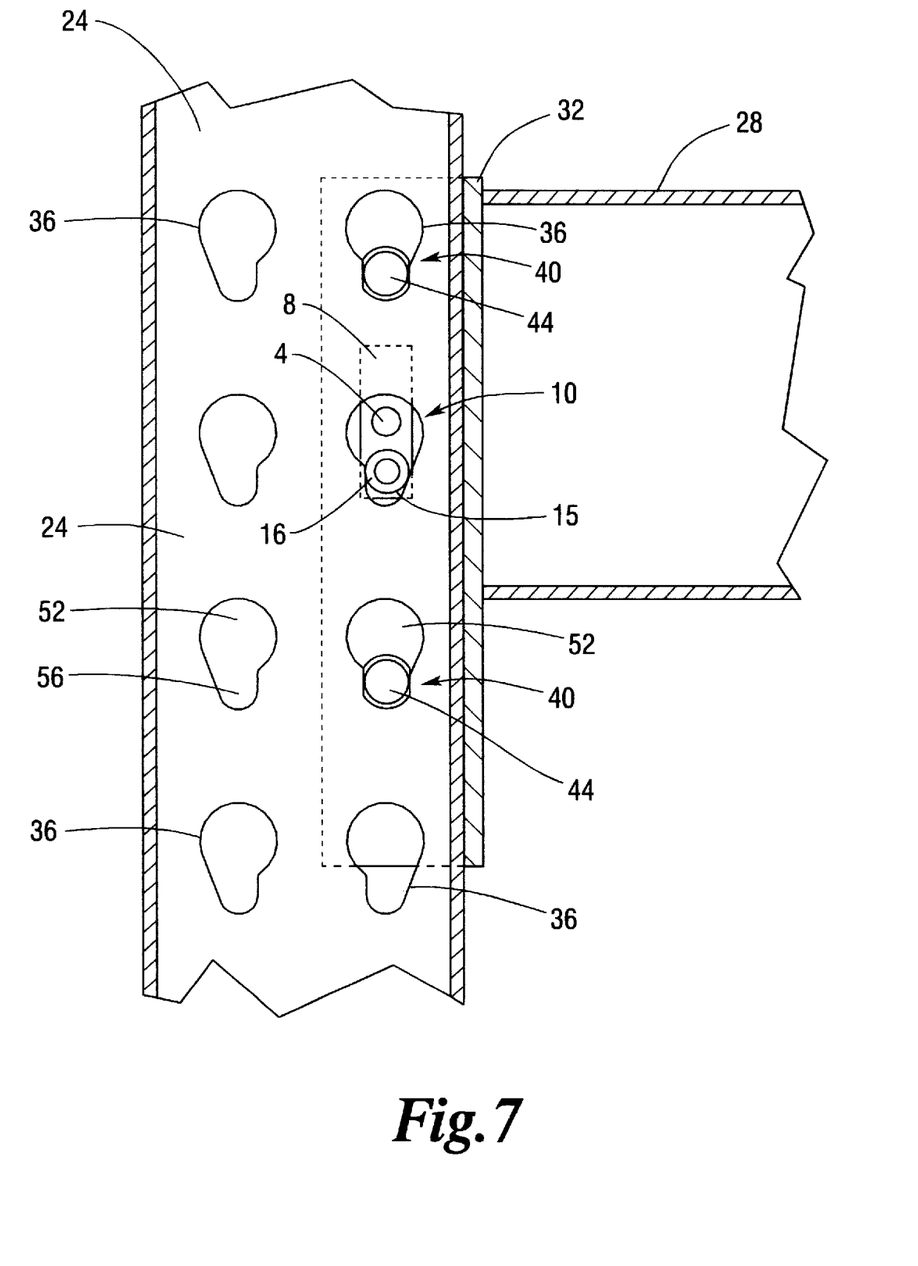
FIG. 7 is a rear sectional view of a vertical frame column having an endplate connector locked in place by an automatic lock according to the invention.

Referring briefly to FIG. 7, once the stud 40 slides into the bottom 56 of the notch 36, the head 44 of the stud 40 continues to extend entirely outside the vertical frame column 24 on a side distal to the endplate connector 32. Being of a diameter wider than the bottom 56 of the notch 36, the head 44 of the stud 40 cannot withdraw laterally from the bottom 56 of the notch 36. Thus, the endplate connector 32 remains locked in position relative to the vertical frame column 24 so long as the studs 40 remain in the bottoms 56 of their respective notches 36. However, in the absence of a locking mechanism, only gravity prevents possible disengagement of the studs 40 from the notches 36 in the event that the rack beam 28 is subjected to an accidental or unintended upward force. Thus, a locking apparatus must be used to restrict unintended disengagement of the studs 40 from the notches 36.

Figure 3A:
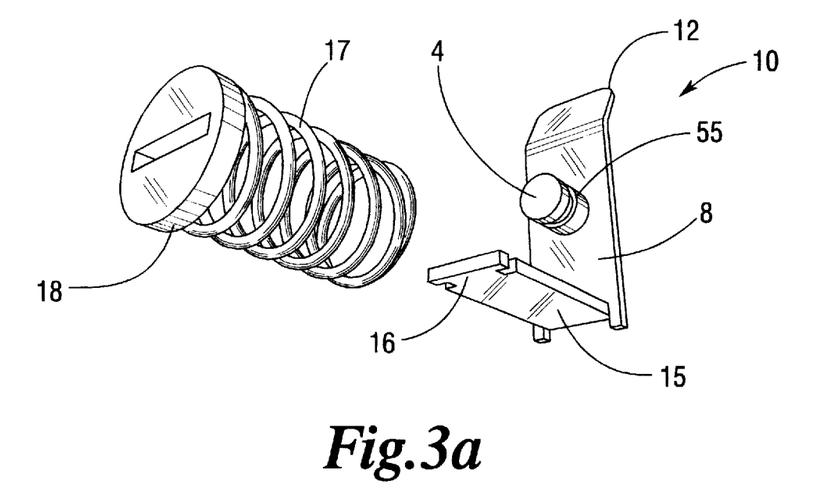
FIG. 3a is a perspective view of one preferred embodiment of the locking mechanism according to the invention, with a tension device and retainer element separated from the tension device and lever assembly.
Figure 3B:
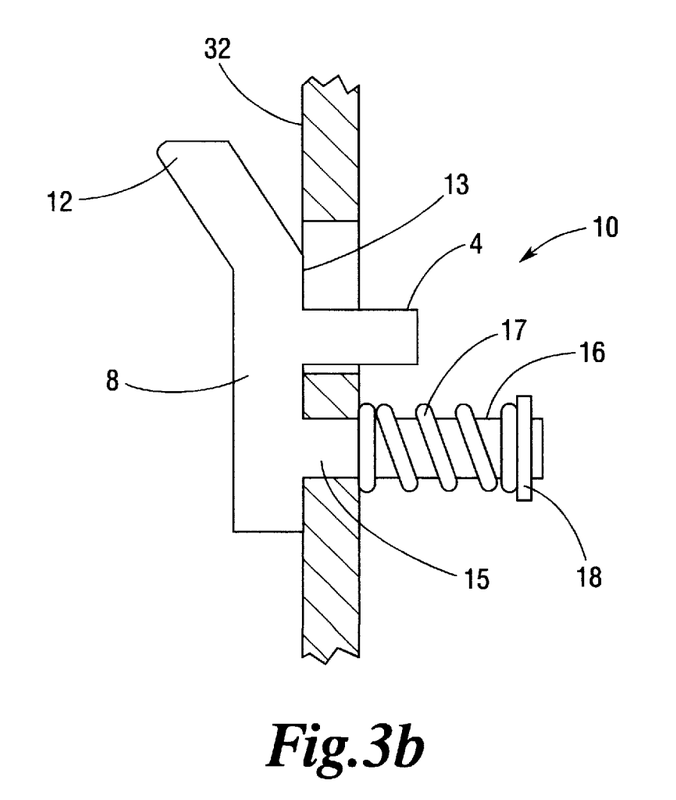
FIG. 3b is a side view schematic of the basic components of an automatic lock mounted on an endplate connector as is appropriately implemented according to the invention.

According to the principles of this invention, an automatic lock 10, mounted on the endplate connector 32, inserts a locking pin 4 into the top 52 of a notch 36 as the studs 40 of the endplate connector 32 slide into the bottoms 56 of their respective notches 36. Referring to FIGS. 3a and 3b, the locking apparatus 10 includes a vertical lever 8 having a finger tab 12. In one preferred embodiment, the finger tab 12 is oriented at an angle to the vertical lever 8, permitting a user to operate the lever using a single finger. Although an angled finger tab 12 is shown and described in this particular embodiment of the invention, it will be appreciated that the lever may include other extensions, tapers, or apertures appropriate for single-fingered operation without departing from the spirit and scope of the invention. A tension support 15 is mounted on the inside face 13 of the vertical lever 8, the tension support 15 having a protruding end 16 that extends through the endplate connector 32 after installation of the automatic lock 10. A tension device 17 is positioned on the endplate connector 32 for exerting a constant spring force between the tension support 15 and endplate connector 32. Although the tension device 17 shown and described in FIG. 3 comprises a spring, it will be appreciated that either a spring, a rubber encapsulation, or similar elastic element may also be incorporated into the design within the invention's scope. In some embodiments, the spring may be compressed into position with a separate retaining element 18 mounted to the protruding end 16 with a twist-locking fastener. By exerting a force between the tension support 15 and endplate connector 32, the tension device 17 biases the inside face 13 of the vertical lever 8 against one surface of the endplate connector 32.

Figure 4:
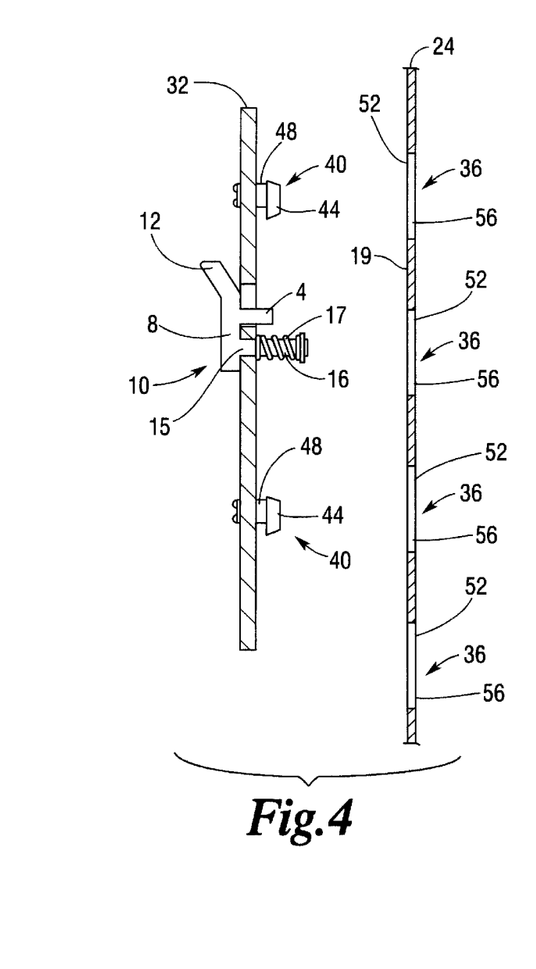
FIG. 4 is a side surface view of an endplate connector having a mounted automatic lock and of a vertical frame column before the interconnection and locking of the endplate connector and vertical frame column.

A locking pin 4 is also mounted on the inside face 13 of the vertical lever 8. Referring now to FIG. 4, the locking pin 4 extends through the endplate connector 32 while the vertical lever is adjacent to the surface of the endplate connector 32 and is also of a length sufficiently long to extend through an adjacent notch 36 on the vertical frame column 24 when the studs 40 of the endplate connector 32 are locked in the bottoms 56 of corresponding notches 36. The locking pin 4 is also positioned to contact a pin contact area 19 on the surface of the vertical frame column 24 whenever the studs 40 of the endplate connector 32 extend through the top 52 of each stud's corresponding notch 36, thereby preventing extension of the locking pin 4 until the studs 40 slide into the bottoms 56 of their respective notches 36.

After insertion of the studs 40 into the top 52 of the notches 36, the downward sliding of the studs 40 into the notch bottoms 56 effects the automatic locking operation of the automatic lock 10. Referring to again to FIG. 4, an automatic lock 10 is installed on an end plate connector 32 having a plurality of studs 40. The studs 40 are not yet inserted into the notches 36 of the endplate connector 32, and the vertical lever 8 is in its biased position adjacent to the surface of the endplate connector 32. Both the protruding end 16 of the tension support 15, with its tension device 17, and the locking pin 4 extend through the endplate connector 32, though neither the protruding end 16 nor the locking pin 4 yet extend through the vertical frame column 24. Here, there is no physical connection yet between the endplate connector 32 and vertical frame column 24.

Figure 5:
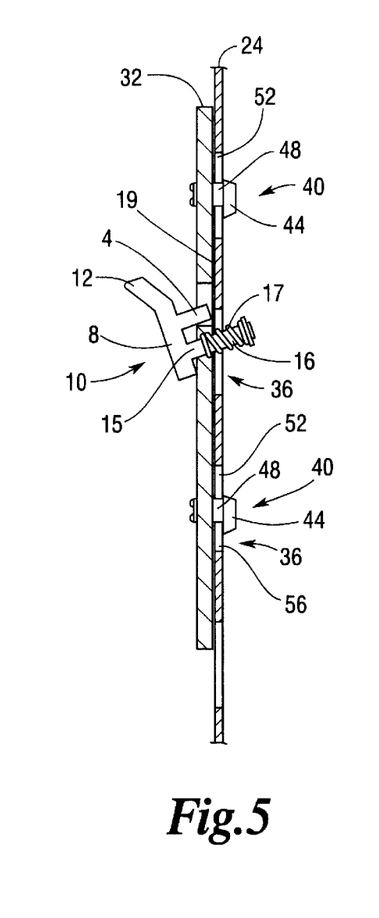
FIG. 5 is a side surface view of an endplate connector having a mounted automatic lock and of a vertical frame column during initial engagement of the endplate connector and automatic lock, but before locking of the endplate connector and vertical frame column by the automatic lock.

Now consider, referring to FIG. 5, insertion of the studs 40 into the notch 36. The heads 44 of the studs 40 are only narrow enough to fit through the top 52 of each notch 36. The automatic lock is positioned on the endplate connector 24 so that insertion of the studs 40 into the notch tops 52 brings the tension support 15 in line with the top 52 of its own corresponding notch 36, allowing the protruding end 16 of the tension support 15 to enter the notch 36 and extend through the vertical frame column 24. The relative position of the automatic lock 10 also brings the locking pin 4 in line with the pin contact area 19 on the surface of the vertical frame column 24. As the studs 40 insert into the notch tops 52, the locking pin 4 contacts the pin contact area 19, which in turn exerts a force against the locking pin 4 and vertical lever 8 opposite the biasing spring force of the tension device 17. The vertical lever 8 consequently retracts from its position adjacent to the vertical frame column 24 as the locking pin 4 is pushed back under the compression of the endplate connector 32 against the vertical frame column 24.

Figure 6:
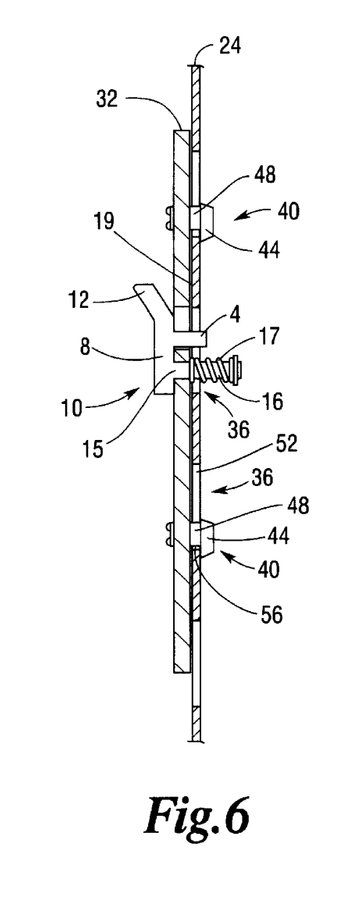
FIG. 6 is a side surface view of an endplate connector having a mounted automatic lock and a vertical frame column after engagement of the endplate connector and automatic lock and after the locking of the endplate connector and vertical frame column by the automatic lock.

Automatic locking action occurs as the studs 40 slide from the notch tops 52 to the notch bottoms 56. Referring now to FIG. 6, the sliding action of the endplate connector 32 slides the studs 40 from the top 52 of each notch 36 to the bottom 56. While the endplate connector 32 moves downward, the protruding end 16 of the tension support 15 also moves toward the bottom 56 of its respective notch 36, as the locking pin 4 continues to contact the pin contact area 19, sliding down the surface of the vertical frame column 24. The compression between the endplate connector 32 and vertical frame column 24 continues to push the locking pin 4 against the biasing spring force of the tension device 17 until the locking pin 4 comes into contact with the top 52 of notch 36 on the vertical frame column 24. The locking pin 4 is mounted on the vertical lever 8 so that the locking pin 4 does not come into contact with a notch top 52 until after the studs 40 enter the bottoms 56 of their corresponding notches 36. After the studs 40 enter the bottoms 56 of their respective notches 36, the locking pin 4 contacts the top 52 of a respective notch 36. Contact with the notch 36 releases compression against the locking pin 4. Consequently, the biasing spring force of the tension device 17 automatically locks the endplate connector in place by exerting a force against the vertical lever 8, pushing the vertical lever 8 back into a biased position with its inside face 13 adjacent to the surface of the endplate connector 32, thereby extending the locking pin 4 into the top 52 of the notch 36. In some embodiments of the invention, the locking pin 4 includes an additional locking pin notch 55 into which the upper surface of the notch top 52 engages upon extension of the locking pin 4.

Once the automatic locking action has occurred, it is not possible for the studs 40 to withdraw from their respective notches 36 without first releasing the automatic locking apparatus 10. Having a diameter larger than the width of the notch bottoms 56, it is not possible for the studs 40 to withdraw laterally from the notches 36. With the locking pin 4 extended into the top 52 of its respective notch 36, it is also not possible for the endplate connector 32 to slide upwards sufficiently for the locking pin 4 to move past its corresponding notch top 52. The locking apparatus therefore prevents the studs 40 from sliding to the tops 52 of the studs' corresponding notches 36, locking the studs 40 and the endplate connector 32 in place.

Once the studs 40 and endplate connector 32 are locked in place, they may be removed from the vertical frame column 24 only by manually releasing the automatic lock apparatus 10. To release the automatic lock 10, a user pulls back on the vertical lever 8 by pulling on the angled finger tab 12. This pulling action moves the vertical lever 8 away from its biased position adjacent the surface of the endplate connector 32, thereby drawing the locking pin 4 out from its respective notch 36. The locking pin 4 is of a length that allows the locking pin 4 to be removed from the notch 36 when the vertical lever 8 is pulled away from the surface of the endplate connector 32. Only after the locking pin 4 is withdrawn from the top 52 of its notch 36 can the studs 40 move freely upward to the top 52 of their respective notches 36, the studs 40 then becoming freely removable from their notches 36, permitting disinfection of the endplate connector 32 from the vertical frame column 24. While sliding the endplate connector 32 and studs 40 out of their respective notches 36, the user must continue to pull on the vertical lever 8 in order to prevent the tension device 17 from again extending the locking pin 4 and again automatically locking the studs 40 and endplate connector 32 in place.

Figure 8A:
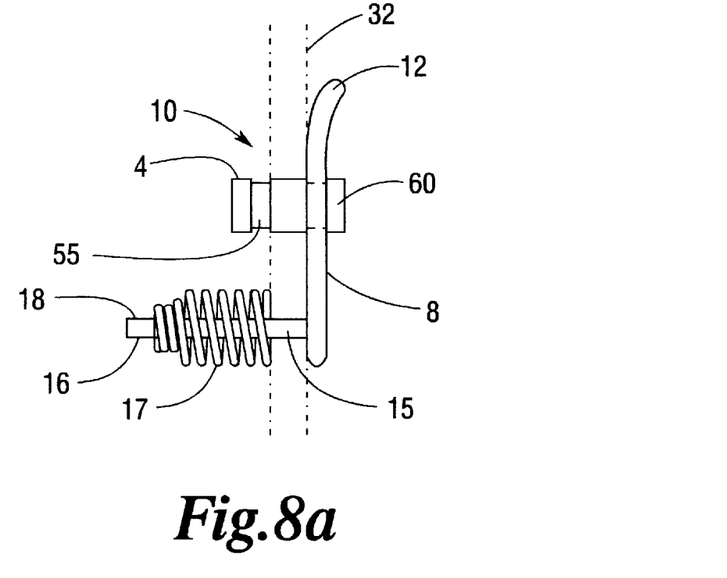
FIG. 8a is a side view of an alternative embodiment automatic lock having a tapered spring and wedged retainer element as is appropriately implemented according to the invention.
Figure 9:
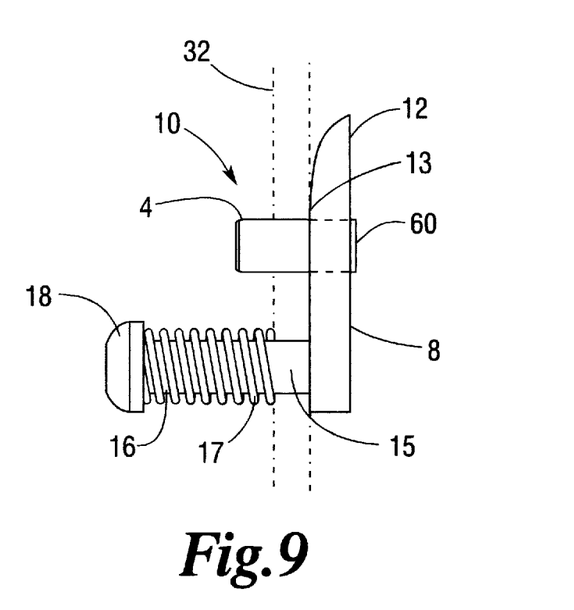
FIG. 9 is a side view of an alternative embodiment automatic lock having a welded locking pin and tapered button retaining element according to the invention.
Figure 10:
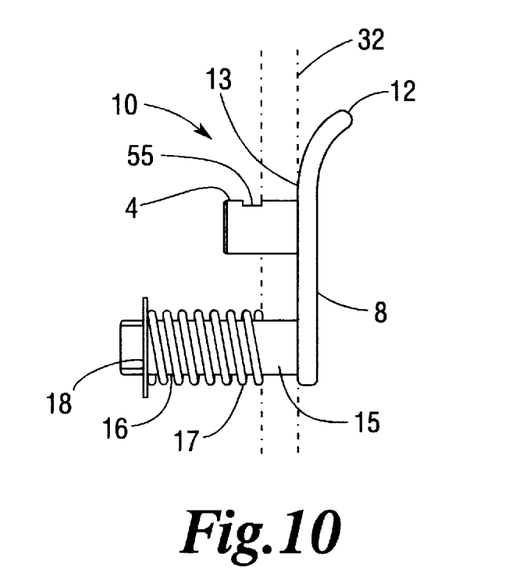
FIG. 10 is a side view of an alternative embodiment automatic lock having a cast locking pin, lever and tension support combination and a spring cap retainer element according to the invention.

Those skilled in the art will recognize that many modifications can be made to the automatic lock described above in the description of the preferred embodiments of this invention without departing from the invention's spirit and scope. Various alternative methods and techniques may be incorporated for coupling the locking pin 4, vertical lever 8, and tension support 15 into a fixed and solidly interconnected component. The embodiment depicted in FIG. 8a includes a substantially cylindrical locking pin 4 with a back pin end 60 inserted through an aperture on the vertical lever 8 and swaged into the lever's back. In FIG. 9, the depicted embodiment includes a similarly inserted cylindrical locking pin 4 wherein the back pin end 60 is welded in place. In an illustrative contrast, the tension support 15 is directly screwed into position in the vertical lever 8. It is also possible to make any combination of the sub-components from a solid cast or shaped piece of material. FIG. 10 depicts an automatic lock 10 having a locking pin 4, vertical lever 8, and tension support 15 formed from a single solid cast component. In the embodiment depicted in FIG. 11 only two of the components, the locking pin 4 and vertical lever 8, comprise a single solid component. In this embodiment, a J-shaped member 64 is bent into shape from a single length of material such as metal and inserted into two separate apertures on the vertical lever 8 to form a single component.

Figure 12:
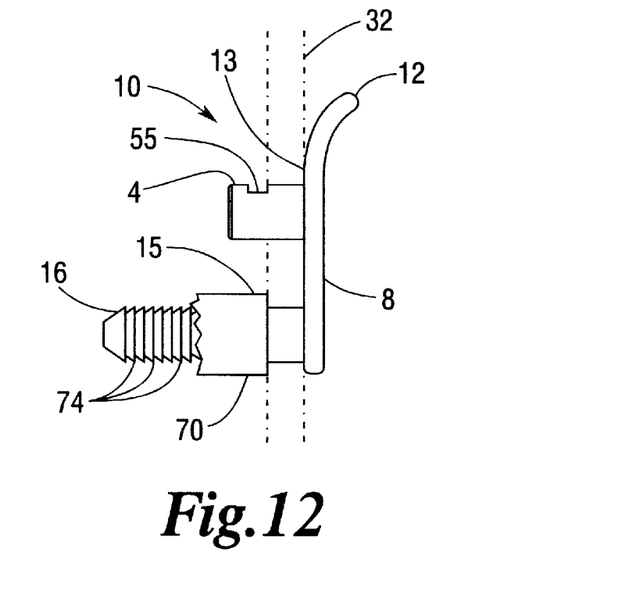
FIG. 12 is a side view of an alternative embodiment automatic lock having a resilient material encapsulating tension device according to the invention.

Alternative methods and configurations also exist for providing tension between the tension support 15 and endplate connector 32. Although the design shown and described in the preferred embodiment incorporates a spring component for the tension device 17, FIG. 12 discloses an alternative resilient encapsulation 70 of rubber or a similar elastic material extending over the length of the tension support 15 from the endplate connector 32 to the protruding end 16. The resilient encapsulation 70 provides spring tension between the tension support 15 and endplate connector 32 by elastically reverting to its formed shape, biasing the inside face 13 of the vertical lever 8 against the surface of the endplate connector 32. The outer surface of the tension support 15 comprises a series of surface grips 74 which extends from near the endplate connector 32 to the protruding end 16 of the tension support 15 and which serves to ensnare the inside surface of the resilient encapsulation 70, securing the encapsulation 70 in place on the tension support 15. In this embodiment, the surface grips also eliminate the need for a separate retaining element 18 mounted to the protruding end 16 for effecting compression of the encapsulation 70 between the tension support 15 and endplate connector 32.

Figure 11:
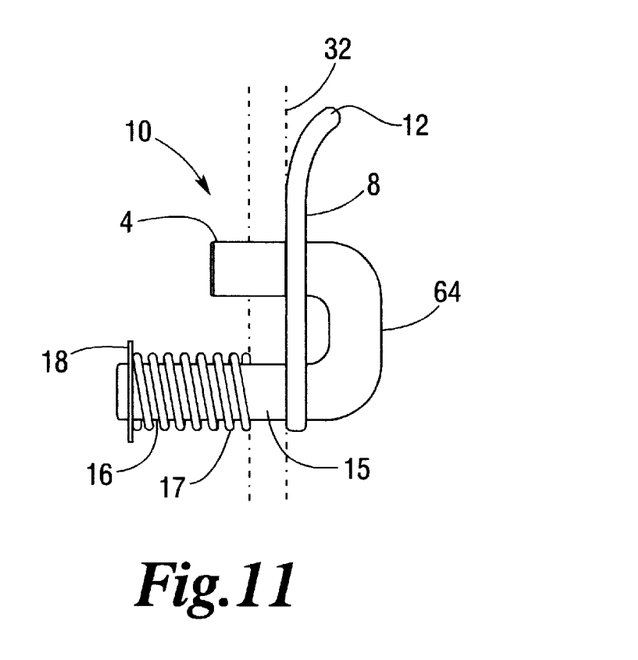
FIG. 11 is a side view of an alternative embodiment automatic lock having a single-component combination locking pin and tension support member and a ring retainer according to the invention.

In embodiments where a separate retaining element 18 to effect compression between the the tension support 15 and endplate connector 32 is required, many alternatives exist for fastening the retaining element to the tension support 15. Referring to FIG. 11, the retaining element 18 may comprise a simple retaining ring mounted on the protruding end 16 of the tension support 15 to capture one end of the tension device 17. In this embodiment, the retaining element 18 includes a plurality of inward-pointed gripper ends that grab into the protruding end 16 of the tension support 15. Alternatively, as depicted in FIG. 10, an inward-gripping spring cap may also be used as a retaining element 18. In this embodiment, the retaining element 18 comprises a thin piece of tabbed metal capable of securely embracing the tension support 15. In FIG. 9, the retaining element 18 comprises a tapered button extending from the protruding end 16.

Figure 8B:
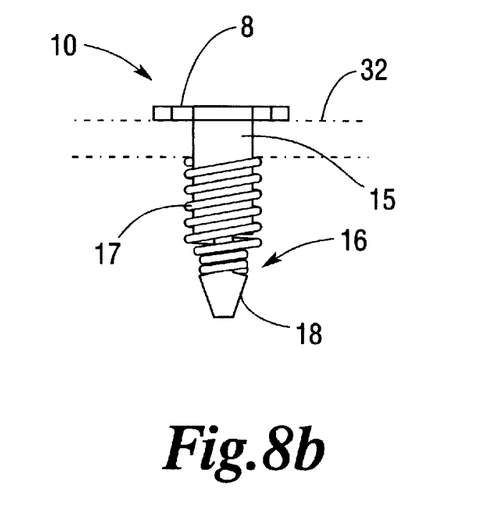

A suitable retaining element may also be formed from the body of the tension support itself. FIGS. 8a and 8b depict an appropriately implemented automatic lock having a flat tabular tension support 15 with a wedge-shaped retaining element 18 formed at the end of the protruding end 16. The tension device 17 is, in this embodiment, tapered to engage the retaining element 18. During assembly, the tension device 17 slides over the retaining element 18, expanding as it passes due to the element's wedged shape. After installation, the tension device 17 remains locked behind the retaining element 18 due to the tapered and wedged shapes of the components. A suitable retaining element may also be formed from the body of the tension support 15 for use with non-tapered tension devices. Referring briefly to the embodiment in FIG. 3a, the block-shaped extension of the protruding end 16 may be twisted to an angle of approximately ten degrees or more from the tabular surface of the tension support 15. Such a twisting modification has the effect of creating a compressing barrier against the tension device 17, essentially making the addition of an extra retaining element 18 optional to achieve the same compressing effect between the tension support 15 and endplate connector 32.

Figure 13A:
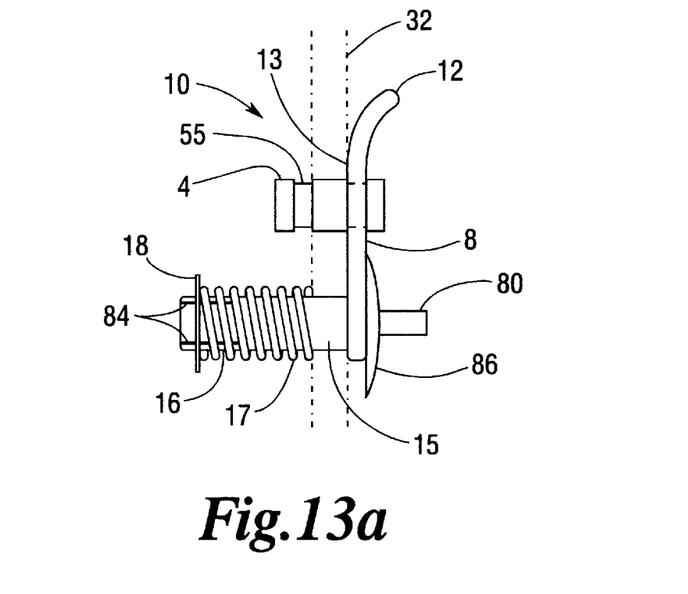
FIG. 13a is a side view of an alternative embodiment automatic lock having a push-pin retainer device before depression of the push-pin according to the invention.
Figure 13B:
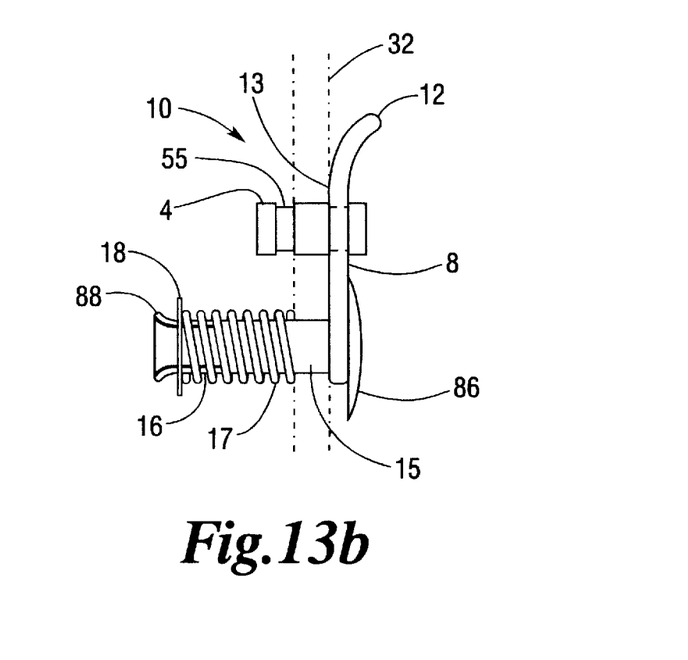
FIG. 13b is a side view of the embodiment of FIG. 13a after depression of the push-pin according to the invention.

FIGS. 13a and 13b illustrate an additional embodiment including a push pin 80 and a plurality of slots 84 on the protruding end 16 of the tension support 15. In this embodiment, the push pin 80 extends inside the length of the tension support 15. A riveting end 86 couples the tension support to the back of the vertical lever 8. The length of the push pin 80 is nearly as long as the tension support 15, and in FIG. 13a, extends nearly to the slots 84 of the protruding end 16. During assembly of this embodiment, a retaining element is fitted over the protruding end 16 of the tension support 15. After the retaining element 18 is positioned on the protruding end 16, the push pin 80 is pushed into the body of tension support 15, as shown in FIG. 13b. Inside the tension support 15, the pin contacts the inside surfaces of the tension support 15 at the slots 84. The inside surface near the slots 84 is spaced close together, resulting in an outside bulge 88 taking form at the protruding end 16 of the tension support 15 as the pin is pushed inward. This outside bulge 88 locks the retaining element 18 against the tension device 17.

Those skilled in the art will recognize that the various features of this invention described above can be used in various combinations with other elements without departing from the scope of the invention. Thus, the appended claims are intended to be interpreted to cover such equivalent locking apparatuses which do not depart from the spirit and scope of the invention.

What is claimed is:

1. A locking apparatus to be mounted on an end plate connector installed on a vertical frame column of a storage rack to restrict upward movement of the end plate connector, the frame column having a plurality of linearly disposed notches at points along the height of the frame column, the notches on the frame each having a top and a bottom, at least one overlapping connector mounted on the end plate connector, each overlapping connector being capable of entering the top of each notch on the frame column when the end plate connector is attached to the frame column, and each overlapping connector also being incapable of entering or withdrawing from the bottom of each notch after the end plate connector is attached to the frame column, said locking apparatus comprising:

a vertical lever including an inside face which is adjacent one surface of the end plate connector when the end plate connector is mounted on the vertical frame column, a locking pin and a tension support both extending from said inside face of said vertical lever;

said tension support having a protruding end extending through the end plate connector when said vertical lever is installed on the end plate connector, a tension device mountable on said tension support so as to create a force which biases said inside face of said vertical lever toward the one surface of the end plate connector when said locking apparatus is installed on the end plate connector;

said locking pin extending through the end plate connector when said locking apparatus is installed on the end plate connector, said locking pin having a length which causes it to extend through the top of a notch of the frame column when the overlapping connectors of the end plate connector are positioned at the bottom of respective notches of the frame column, said locking pin restricting upward movement of each overlapping connector toward the top portion of each notch, thereby preventing withdrawal of each overlapping connector from each notch;

the length of said locking pin allowing said locking pin to be removed from the notch on the frame column when said vertical lever is pulled away from the one face of the end plate connector against said tension device, thereby allowing upward movement of each overlapping connector toward the top portion of each notch and allowing withdrawal of each overlapping connector from each notch.

2. The locking apparatus of claim 1 further comprising a locking pin notch on said locking pin for engaging the upper surface of a notch top on said frame column upon extension of said locking pin through the notch top.

3. The locking apparatus of claim 1 having a locking pin that is substantially cylindrical in shape.

4. The locking apparatus of claim 1, said vertical lever having a finger tab oriented at an angle to said vertical lever for single finger unlocking of said locking apparatus.

5. The locking apparatus of claim 1, said tension support having a retaining element mounted on said protruding end of said tension support for compressing said tension device into position on said tension support.

6. The locking apparatus of claim 1, said tension support having a retaining element formed from said protruding end of said tension support for compressing said tension device into position on said tension support.

7. The locking apparatus of claim 1, said tension device comprising a spring coiled around said tension support and positioned between said tension support and the endplate connector.

8. The locking apparatus of claim 1, said tension support having an outside surface including a series of surface grips, a resilient encapsulation having an inside surface and surrounding said outside surface of said tension support, said surface grips being positioned to ensnare said inside surface of said resilient encapsulation to position said resilient encapsulation between said tension support and the endplate connector.

9. An end plate connector configured to lock onto a vertical frame column of a storage rack to restrict upward movement of said end plate connector when it is mounted on the frame column, the frame column having a plurality of linearly disposed notches at points along the height of the frame column, the notches on the frame each having a top and bottom, said end plate connector comprising:

an end plate having an outside surface and an inside surface, which is adjacent the frame column when said end plate connector is mounted on the frame column, at least one overlapping connector mounted on said inside surface of said end plate, each overlapping connector being capable of entering the top of each notch on the frame column when said end plate connector is mounted on the frame column, each overlapping connector also being incapable of entering or withdrawing from the bottom of each notch after said end plate connector is mounted on the frame column;

a vertical lever attached to said end plate connector, said vertical lever including an inside face which is adjacent said outside surface of said end plate when said end plate connector is mounted on the vertical frame column, a locking pin and a tension support both extending from said inside face of said vertical lever;

said tension support having a protruding end which can extend through said end plate, and a tension device mounted on said tension support so as to create a force which biases said inside face of said vertical lever toward said outside surface of said end plate when said vertical lever is attached to said end plate connector;

said locking pin extending through said end plate when said end plate connector is mounted on the frame column, said locking pin having a length which causes it to also extend through the top of a notch of the frame column when the overlapping connectors of said end plate are positioned in the bottom of respective notches of the frame column, the locking pin restricting upward movement of each overlapping connector toward the top portion of each notch, thereby preventing withdrawal of each overlapping connector from each notch;

the length of said locking pin allowing said locking pin to be removed from the notch on the frame column when said vertical lever is pulled away from said outside surface of said end plate connector against said tension device, thereby allowing upward movement of each overlapping connector toward the top portion of each overlapping connector's respective notch and allowing withdrawal of each overlapping connector from each notch.

10. The end plate connector of claim 9 further comprising a locking pin notch on said locking pin for engaging the upper surface of a notch top on said frame column upon extension of said locking pin through the notch top.

11. The end plate connector of claim 9 having a locking pin that is substantially cylindrical in shape.

12. The end plate connector of claim 9, said vertical lever having a finger tab oriented at an angle to said vertical lever for single finger unlocking of said locking pin.

13. The end plate connector of claim 9, said tension support having a retaining element mounted on said protruding end of said tension support for compressing said tension device into position on said tension support.

14. The end plate connector of claim 9, said tension support having a retaining element formed from said protruding end of said tension support for compressing said tension device into position on said tension support.

15. The end plate connector of claim 9, said tension device comprising a spring coiled around said tension support and positioned between said tension support and said endplate connector.

16. The end plate connector of claim 9, said tension support having an outside surface including a series of surface grips, a resilient encapsulation having an inside surface and surrounding said outside surface of said tension support, said surface grips being positioned to ensnare said inside surface of said resilient encapsulation to position said resilient encapsulation between said tension support and said endplate connector.

17. The locking apparatus of claim 1 wherein said notches are tapered, each notch being wider at its top and narrower at its bottom, each overlapping connector comprising a stud and having a base coupled to the end plate connector and a head distal to the end plate connector, the head of each stud being substantially wider than the base of each stud, each head being sufficiently narrow to enter the top of each notch on the frame column when the end plate connector is attached to the frame column, each head also being sufficiently wide to be incapable of entering or withdrawing from the bottom of each notch after the end plate connector is attached to the frame column.

18. The locking apparatus of claim 1 wherein said tension device causes said tension support to create a force which pulls said inside face of said vertical lever toward the one surface of the end plate connector when said locking apparatus is installed on the end plate connector.

19. The locking apparatus of claim 1 wherein said locking pin and said tension support both fixedly extend from said inside face of said vertical lever.

20. The end plate connector of claim 9 wherein said notices of said frame column are tapered so that each notch is wider at its top and narrower at its bottom, each overlapping connector comprising a stud and having a base coupled to said end plate and a head distal to said end plate, the head of each stud substantially wider than the base of each stud, each head being sufficiently narrow to enter the top of each notch on the frame column when said end plate connector is mounted on the frame column, each head also being sufficiently wide to be incapable of entering or withdrawing from the bottom of each notch after said end plate connector is mounted on the frame column.

21. The end plate connector of claim 9 wherein said tension device causes said tension support to create a force which pulls said inside face of said vertical lever toward said outside surface of said end plate when said vertical lever is attached to said end plate connector.

22. The end plate connector of claim 9 wherein said locking pin and said tension support both fixedly extend from said inside face of said vertical lever.

* * * * *